(12) United States Patent
Raman et al.

(10) Patent No.: US 12,554,895 B2
(45) Date of Patent: Feb. 17, 2026

(54) ENCRYPTED ANALYTICAL VAULT FOR TRUSTED ACCESS

(71) Applicant: Portal26, Inc., Los Gatos, CA (US)

(72) Inventors: Arti Raman, Los Gatos, CA (US); Nikita Raman, Los Gatos, CA (US); Karthikeyan Mariappan, Los Gatos, CA (US); Fadil Mesic, Los Gatos, CA (US); Seshadhri Pakshi Rajan, Los Gatos, CA (US)

(73) Assignee: Portal26, Inc., Los Gatos, CA (US)

(*) Notice: Subject to any disclaimer, the term of this patent is extended or adjusted under 35 U.S.C. 154(b) by 801 days.

(21) Appl. No.: 17/684,798

(22) Filed: Mar. 2, 2022

(65) Prior Publication Data

US 2022/0269828 A1     Aug. 25, 2022

Related U.S. Application Data

(63) Continuation-in-part of application No. 17/512,546, filed on Oct. 27, 2021, now Pat. No. 12,299,125.

(60) Provisional application No. 63/106,253, filed on Oct. 27, 2020.

(51) Int. Cl.
    *G06F 21/78* (2013.01)
    *G06F 16/22* (2019.01)
    *H04L 9/08* (2006.01)

(52) U.S. Cl.
    CPC .............. *G06F 21/78* (2013.01); *G06F 16/22* (2019.01); *H04L 9/0819* (2013.01)

(58) Field of Classification Search
    CPC .. G06F 21/566; G06F 21/602; G06F 16/2264; G06F 16/953; G06F 2221/034; H04L 9/005
    See application file for complete search history.

(56) References Cited

U.S. PATENT DOCUMENTS

| | | | |
|---|---|---|---|
| 10,097,522 B2* | 10/2018 | Philipp | H04L 9/0894 |
| 11,539,523 B1* | 12/2022 | Miranda | H04L 9/3213 |
| 2010/0111297 A1 | 5/2010 | Pauker et al. | |
| 2010/0250497 A1 | 9/2010 | Redlich et al. | |
| 2012/0084135 A1 | 4/2012 | Nissan et al. | |
| 2016/0366113 A1* | 12/2016 | Dawoud | G06F 16/14 |
| 2017/0078251 A1* | 3/2017 | Grubbs | G06F 16/951 |
| 2017/0093826 A1 | 3/2017 | Werneyer | |
| 2019/0220620 A1* | 7/2019 | Hahn | H04L 63/0428 |
| 2019/0253431 A1 | 8/2019 | Atanda | |
| 2019/0394227 A1 | 12/2019 | Reybok, Jr. et al. | |
| 2020/0059350 A1 | 2/2020 | Nandan et al. | |
| 2020/0159779 A1* | 5/2020 | Dong | H04L 9/0631 |

(Continued)

OTHER PUBLICATIONS

International Search Report and Written Opinion issued Mar. 2, 2022 in corresponding PCT Application No. PCT/US2021/56904, filed Oct. 27, 2021. Inventor(s) Raman, Arti et al.

(Continued)

*Primary Examiner* — Matthew T Henning
(74) *Attorney, Agent, or Firm* — Goodwin Procter LLP (57) ABSTRACT

An encrypted analytical vault may implement an entanglement process in data encryption when storing the data, and may include an native search plugin for searching the encrypted data. The encrypted analytical vault thus allows the data stored in the vault to be searchable, aggregable, and sortable while the data are still encrypted in the vault.

19 Claims, 6 Drawing Sheets

(56) References Cited

U.S. PATENT DOCUMENTS

2020/0228308 A1* 7/2020 Shainski ............. G06F 21/6227
2020/0250318 A1  8/2020 Al Belooshi

OTHER PUBLICATIONS

International Search Report and Written Opinion issued May 26, 2023 in corresponding PCT Application No. PCT/US2023/63593, filed Mar. 2, 2023. Inventor(s) Raman, Arti et al.

* cited by examiner

Raw Data / Search Results

First Name: "AYZhl,SQp/k05yLAfaDTSi52cjyUlVabTjolUaJaT6"
Last Name: "AYeOKqX85GbeASG57KsPfnkIZimrfhg5IXag3yu6UB1"
Date of Birth: "AS5GOi/zggLGIKUQ574XgEeWG4nBLhzg9Jv4vMtDhh0"
Salary: "AW9NhEoMibEMZOH9sur2OcbiLFRb6oEclcqBHcOikU"
Address: "AYrYMrBZf9Ufebx+MSKoo0bRx3lowWrATpjgzMU0gBxvD"

101 → 103

Release Schema In Action
(i.e., What Can They See)

| | HR analyst | Head of HR | Legal Counsel |
|---|---|---|---|
| First Name: | ***** | John | John |
| Last Name: | ***** | Smith | Smith |
| Date of Birth: | 10/23/80 | 10/23/80 | ***** |
| Salary: | $120,978 | $120,978 | ***** |
| Address: | ***** | 123 Main St, Nashville, TN 37011 | 123 Main St, Nashville, TN 37011 |

ENCRYPTED ANALYTICAL VAULT FOR TRUSTED ACCESS

CROSS-REFERENCE TO RELATED APPLICATION

This application is a continuation-in-part of U.S. patent application Ser. No. 17/512,546, filed on Oct. 27, 2021, and titled "The Use Of Data Entanglement For Improving The Security Of Search Indexes While Using Native Enterprise Search Engines And For Protecting Computer Systems Against Malware Including Ransomware," which claims the benefit of U.S. Provisional Patent Application No. 63/106,253, filed on Oct. 27, 2020, and titled "Use Of Data Entanglement For Improving The Security Of Search Indexes While Using Native Enterprise Search Engines And For Protecting Computer Systems Against Malware Including Ransomware." The entire contents of both applications are incorporated herein by reference in their entireties.

TECHNICAL FIELD

This disclosure relates to a vault for data storage and, more particularly to, an encrypted analytical vault that allows searches on encrypted indices and provides search results for encrypted data stored in the vault.

BACKGROUND

Data vaults have been used by enterprises as a warehouse platform for data storage. Fueled by software as a service (SaaS) trends, more and more data is now outsourced to remote (cloud) storage providers for backend storage in enterprise computing. For instance, cloud storage services allow enterprises to efficiently outsource their data anytime and anywhere for backend storage. Such cloud storage services may provide convenience to customers and enterprises, but also lead to privacy concerns. While storage providers may not read enterprises' data, attackers may gain access by exploiting vulnerabilities in the providers' storage system. Data may also be leaked by curious administrators.

Data owners want to be certain that their data is safe against hacking by outsiders, internal threats, and untrusted service providers alike. To safeguard the data, an encrypted vault may be used by enterprises to encrypt all the data before submitting them for backend cloud storage. This method, however, makes it impossible to efficiently search and/or analyze encrypted stored data since this type of activity requires data to be queried in flexible ways and research results to be analyzable. Therefore, most analytical vaults used by the enterprises currently retain data in cleartext (i.e., in a non-encrypted form), which poses a substantial risk for the enterprises as discussed above.

SUMMARY

To address the aforementioned shortcomings, an encrypted analytical vault is disclosed that secures the data stored in the vault. Although the stored data is encrypted, it can still be searched and analyzed as if it were in cleartext format.

According to some embodiments, the present disclosure provides an encrypted analytical vault that secures the data by entangling it prior to index construction and encryption. The encrypted analytical vault secures data while allowing it to be searched and analyzed without the penalty posed by decryption and re-encryption using traditional approaches. The encrypted analytical vault may allow the secure data format(s) to become established as the de-facto secured formats in the vault. In this modality, all sensitive data are secured as soon as they are ingested by the vault before persisting it, thereby making it easy to share the data without worrying about breaches. In addition, other systems that must access the data may be granted the right set of privileges to consume, search, and analyze the secured data which may not be in the form of cleartext for improved security.

The foregoing is a summary and thus contains, by necessity, simplifications, generalizations and omissions of detail; consequently, the summary is illustrative only and is not limiting in any way. Other aspects, inventive features, and advantages of the systems and/or processes described herein will become apparent in the non-limiting detailed description set forth herein.

BRIEF DESCRIPTION OF THE DRAWINGS

The disclosed embodiments have advantages and features which will be more readily apparent from the detailed description, the appended claims, and the accompanying figures (or drawings). A brief introduction of the figures is provided below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of the disclosure.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

The disclosure relates to an encrypted analytical vault that allows searches on encrypted indices and provides search results for encrypted data stored in the encrypted analytical vault. The encrypted analytical vault may provide such functions for stored data by implementing a data entanglement process in data encryption for the stored data. According to some embodiments, the data entanglement process includes a key-based confusion process configured to obfuscate the input data by preserving the position context of the input data so that data can be searched by key-based search engines. In addition, the data entanglement process may include a key-based diffusion process configured to obfuscate the input data but protect the term context used when implementing a search. The as-encrypted data is thus searchable due to the preservation of position information and term context of the input data after the data entanglement, which then allows the encrypted data to be searchable, even when a search is conducted with a native search engine configured to perform cleartext searches.

The disclosed encrypted analytical vault has several advantages over existing data encrypted vaults. First, the disclosed encrypted analytical vault fills the void between encryption (where very little analytics is possible) and cleartext (which is entirely analyzable, but offers no security) to create a continuum. The disclosed encrypted analytical vault allows a customer to balance security, performance, and searchability/analyzability. According to some embodiments, the encrypted analytical vault supports a variety of search types, including but not limited to, range searches, wildcard searches, regular expression pattern matching searches, prefix searches, and term/phrase match searches.

Additionally, the disclosed encrypted analytical vault (also referred to herein as "vault") allows the secure data format(s) to become established as the de-facto secured formats in the vault. In this modality, all sensitive data would be secured as soon as it enters the vault, making it easy to share such data between parties without worrying about potential data breaches. In addition, all systems outside the vault that need to access the stored data to perform various tasks, such as searches and/or data analysis, would be granted an appropriate set of privileges to do so. Therefore, sensitive data does not have to be stored in the vault as cleartext for it to be properly accessed and analyzed by a party's system.

A. Introduction of Encrypted Analytical Vault

Encrypted analytical vault is an identity-based secrets and encryption management system. A secret is anything that a party wants to tightly control access to, such as application programming interface (API) encryption keys, passwords, certificates, or structured and unstructured documents. Encrypted analytical vault provides encryption services that are gated by authentication and authorization methods. Using the vault's user interface (UI), command line interface (CLI), or hypertext transfer protocol (HTTP API), access to secrets and other sensitive data can be securely stored and managed, tightly controlled (restricted), and auditable.

Some basic features of an encrypted analytical vault include secure secret storage, data encryption, leasing and renewal, and revocation. With respect to the secure secret storage, arbitrary key/value secrets may be stored in an encrypted analytical vault. The vault encrypts these secrets prior to writing them to persistent storage, so gaining access to the raw storage isn't enough to access the secrets. The encrypted analytical vault can write to disk, console, and more.

With respect to data encryption, an encrypted analytical vault may encrypt and decrypt data without storing it. This allows security teams to define encryption parameters and developers to store encrypted data in a location such as SQL without having to design their own encryption methods.

With respect to leasing and renewal, all secrets in an encrypted analytical vault may have a lease associated with them. At the end of the lease, the vault may automatically revoke access to that secret. Clients are able to renew leases via built-in renew APIs.

With respect to revocation, an encrypted analytical vault may have built-in support for secret revocation. The vault can revoke not only single secrets, but a tree of secrets, for example, all secrets read by a specific user, or all secrets of a particular type. Revocation assists in key rolling as well as locking down systems in the case of an intrusion. The following further provides some example vaults for real applications.

In one example, an encrypted analytical vault may be used for general secret storage. For example, an encrypted analytical vault may be used for the storage of any secrets. The vault may be ideal to store sensitive environment variables, database credentials, API keys, etc. Compare this with the current way to store these which might be plaintext in files, configuration management, a database, etc. it may be much safer to query these using vault read or the API. This protects the plaintext version of these secrets as well as records access in the vault audit log.

According to some embodiments of the disclosure, the encrypted analytical vault may be used in the transactional mode and analytical mode simultaneously. By way of example and not limitation, transactional use of stored data can include adding new employee information to an employee table or updating information of existing employees. Respectively, analytical use of stored data can include searching for the top 3 sales people by revenue within a state and their 3 top deals. From these examples, it can be seen that the data stored in the encrypted analytical vault is generally indexed and fully searchable, aggregable, and sortable. Accordingly, an encrypted analytical vault disclosed herein not only allows a user to store encrypted documents in the vault, while enabling the authorized users to efficiently search and/or retrieve all or a subset of the stored data in an efficient and privacy-preserving manner.

In addition to being able to store secrets, an encrypted analytical vault may be used to encrypt/decrypt data that is stored elsewhere. The primary use of this is to allow applications to encrypt their data while still storing it in the primary data store.

In some embodiments, the sensitive fields (e.g., sales amount, customer names) included in the data stored in the encrypted analytical vault are indexed using federal information processing standard (FIPS) 140-2 compliant encryption. FIPS 140-2 is the overarching national institute of standards and technology (NIST) security standard for cryptographic modules transmitting sensitive but unclassified information. In some embodiments, the searching indices, for searching data stored in the encrypted analytical vault, are built using encrypted data, as will be described in greater detail later. Accordingly, in the disclosed encrypted analytical vault, the searches may be executed on the encrypted indices and the search results may be produced using the encrypted data.

In some embodiments, the encrypted analytical vault may also release data with different visibility to different users, thereby enabling data privacy when serving requests from customers. For example, when an analyst requests the data from the vault, the released data may see just a few fields in cleartext. On the other hand, when an executive requests the data, the released data may show all the fields in cleartext.

In some embodiments, the encrypted analytical vault is configured to perform additional data transformations to the search results. According to some embodiments, certain data may be blurred in precision when it is released. By way of example and not limitation, an age of 45 may be converted to a range such as 40-50. Other types of data transformations may be also possible for the disclosed encrypted analytical vault.

In some embodiments, the encrypted analytical vault may decrypt and re-encrypt the stored data with salt to produce spreads (e.g., data sharing between vaults). Salting is a concept that typically pertains to password hashing. Essentially, it's a unique value that can be added to the end of a password or encryption key to create a different hash value. This adds an additional layer of security to the hashing process, specifically against brute force attacks in which a computer or botnet attempts every possible combination of letters and numbers until the password is found.

In some embodiments, an organization may use several encrypted analytical vaults, among which one may be used to decrypt the data encrypted by another encrypted analytical vault. This data decryption and re-encryption process may serve as an interchange format for securely passing or spreading data to other organizations or other parts of a same organization.

It should be noted that in the disclosed encrypted analytical vault, while the data is encrypted, the data ingest and search performance are comparable to search engines where indices are built on cleartext data. In the following, exemplary processes for entanglement-based data encryption and/or search for the as-encrypted data are further described.

B. Data Entanglement Process

As disclosed elsewhere herein, to allow the encrypted data to be searchable, sortable, and aggregable, the disclosed encrypted analytical vault may include a data-preprocessing component configured to preprocess the input data prior to index construction and encryption. The preprocessing component may be coupled to or become a part of a cryptography engine configured to encrypt/decrypt data for storage. According to one embodiment, the preprocessing component may implement a data entanglement process to preprocess the data prior to the index construction and data encryption, as described in greater detail hereinafter.

In some embodiments, the data entanglement process disclosed herein may utilize a key to dynamically create two types of data transformations to input data, that is, the input data confusion and diffusion.

In the key-based data confusion, a key is utilized to create a unique multi-dimensional space used to alter the positional context of the original input data. Multiple alterations may be made, but these are deterministic—e.g., the same key would allow the present entanglement process to reproduce the same position alterations. This serves to obfuscate the data but still preserves positional context to an extent that it can be found by a key-based search engine.

In the key-based data diffusion, the same key may be utilized to alter the data so that the input characters are different from those that make up the entangled string. The present diffusion process is such that even when the same key is used, a given set of characters in the input data do not end up being mapped to a constant set of characters in the entangled output. Additionally, multiple alterations are made, but the variation in output characters can be deterministically reproduced every time a given key is applied to the same input data. As a result, key-based diffusion obfuscates the data, but still protects the term context used to implement the search.

According to one embodiment, the data preprocessing component may create an entangled string E as a function of the input string I and the entanglement key k according to the following relationship:

$$E = f(I, k)$$

Function E is further made up of two components (e.g., the confusion step and the diffusion step), each of which is a function of the key as well as the input data:

$$E(I,k) = c(I,k) + d(I,k)$$

Positional context is positional information in the entangled string relative to the positions of characters in the input string. Retaining positional context to any extent means that after the entanglement process, the entangled string retains some positional information that can be traced back to the original input data. Smaller positional information translated to a more secure transformation but a longer data retrieval process during the search. Applying $c(I,k)$ to input string/using key k produces a confused string which includes a positional component p:

$$c(I,k) = E_c + p$$

Similarly, term context is term information in the entangled string relative to the characters that make up the original input string. Retaining term context to any extent also means that the terms in the entangled string can be traced back to specific characters in the original string. The most secure transformation would be the one where characters in the entangled string would have no correlation with the original input. However, this would also render the string unsearchable in its transformed form. According to some embodiments, the data preprocessing component may retain some term context and balance the amount of context retained with the time it takes a search engine to sift through it and connect it with the original input data. Applying $d(I,k)$ to input string I using key k produces a diffused string which includes a term component t:

$$d(I,k) = E_d + t$$

Since the entanglement function E is the sum of the confusion step and the diffusion step as discussed above (i.e., $E(I,k) = c(I,k) + d(I,k)$), when the preprocessing component applies the present entanglement function to an input string, it produces an output string with the following characteristics:

$$E = E_c + E_d + p + t,$$

which can be written as:

$$E = E_b + p + t$$

provided that $E_c$ and $E_d$ are combined together into $E_b$.

According to some embodiments, a given input cleartext string, I, is defined as the ordered set $\{i_1, i_2, i_3, \ldots i_n\}$, and its corresponding entangled string, E, is defined as the ordered set $\{e_1, e_2, e_3, \ldots e_m\}$, with n not being equal to m. Consequently, the entangled string $E = f(I,k)$ can be written as:

$$e_{1-m} = f(i_{1-n}, k).$$

It is noted that while the subscripts for $\{i_1, i_2, i_3, \ldots i_n\}$ and $\{e_1, e_2, e_3, \ldots e_m\}$ both use contiguous numbers (e.g., 1, 2, 3, etc.), these do not imply a direct correlation in position between ix and ex for any given x.

In the absence of k and any other entangled strings, an entangled string E, when examined by itself, would not divulge any information about the original input string I. The presence of p and t inside E would not create information leaks or other security problems as they would be indistinguishable from the overall entangled string.

Components p and t, can be used by existing native search engines to sort through entangled data.

a) Instructing Native Search Engines to Examine Entangled Data

As discussed above, when using existing native search engines to perform searches, term and position information must be provided and used on the entangled data. For normal cleartext data defined as items I={I1, I2, I3, . . . }, the Search Term is defined as T. The type of search determines the position element (e.g., the Search Position), such as the prefix (e.g., start), suffix (e.g., end), and wildcard (e.g., anywhere). Assuming the Search Position is P, a search would be defined as:

Look for any $I_x$ in $\{I_1, I_2, I_3, \ldots\}$, where T is found in position P within I.

If each I consists of a series of characters $i_x = i_1 i_2 i_3 \ldots i_n$, then P is the value of x, and the above statement can be written as:

Look for any I in $\{I_1, I_2, I_3, \ldots\}$, where $i_P = T$

For prefix searches P=1, for suffix searches P=n or the last value in the string. For wildcard searches this input is iterative:

Look for any $I_x$ in $\{I_1, I_2, I_3, \ldots\}$, where $i_1 = T$ or $i_2 = T$ or $i_3 = T \ldots$ or $i_n = T$.

RegEx (e.g., position-specific pattern) terms would be an extension of the above where the search engine would be supplied with T values for individual values of P. Here, the Search Term and Search Position are two inputs that traditional search engines utilize.

The present search engine works on entangled data with no variation in its fundamental components because the entangled data have positional and term components P and T.

For the entangled data defined as items E={$E_1$, $E_2$, $E_3$, . . . } and Search Term as T. The type of search determines the position element (e.g., the Search Position), such as the prefix (e.g., start), suffix (e.g., end), and wildcard (e.g., anywhere). Assuming the Search Position is P. The search being requested could be written as:

Look for any $I_x$ in $\{I_1, I_2, I_3, \ldots\}$, where T is found in position P within I.

However, the requested search for the entangled data would be written as:

Look for any $E_x$ in $\{E_1, E_2, E_3, \ldots\}$, where T is found in position P for the corresponding cleartext data I.

Each E consists of a series of characters $e_x = e_1 e_2 e_3 \ldots e_m$ with m being different from n in the equivalent cleartext series of characters $i_x = i_1 i_2 i_3 \ldots i_n$. The native search engine translates T and P into equivalent constructs that can be applied to E instead of I—the search translation function.

The search translation function needs to translate T into $T_e$ and P into $P_e$ so that they can be used on entangled data E. The search translation function would then provide the native search engine with the following:

Look for any $E_x$ in $\{E_1, E_2, E_3, \ldots\}$, where $T_e$ is found in position $P_e$.

Given that n is not equal to m, the cleartext Search Term T will not be equivalent in length to the translated Search Term $T_e$. Further, given the application of the confusion function, Pe will not have direct positional correlation with the original P. So the search translation function, ES, is similar but not the same as the original entanglement function E(i,k):

$$ES_{i \ldots q} = h(T, k, P)$$

E=f(I,k) and ES=u(E,P). Tis used as the input argument into E, and P is added as an additional argument. This results in ES=h(T,k,P). The above function yields a variable number, q, of outputs depending on k and P:

$$ES(T,k,P) = \{T_1 P_1, T_2 P_2, T_3 P_3, \ldots T_q P_q\}, \text{ where } q = f(k, P).$$

$$ES(T,k,P) = \text{The set of all } (T_i P_i) \text{ for } i=1 \text{ to } q.$$

$T_e$ then becomes the set of all $T_i$ and $P_e$ becomes the set of all $P_i$ presented with the corresponding $T_i$.

$$ES = T_e + P_e = \text{The set of all } (T_i P_i) \text{ for } i=1 \text{ to } q.$$

Since n (e.g., the length of the input string I) and m (e.g., the length of the entangled string E) are not equal, the number of values that can be assumed by P for the cleartext string is going to be different from the number of values that can be assumed by $P_e$ for the entangled string E. This is also true of T and $T_e$. Thus, a single T can produce multiple $T_e$.

This provides enough information to the native search engine to do what it usually does for a search without noticing a difference. In cases where q>1, the encrypted analytical vault provides the search engine with multiple requests, all of which would facilitate the equivalent of a single search on cleartext data.

Where the original search would be the following:

Look for any $I_x$ in $\{I_1, I_2, I_3, \ldots\}$ where T is found in position P within I The modified instructions would be the following:

Look for any $E_x$ in $\{E_1, E_2, E_3, \ldots\}$ where $t_1$ is found in position $p_1$ or $t_2$ is found in position $p_2$ or $t_3$ is found in position $p_3$ . . . or $t_q$ is found in position $p_q$ within an individual E which is the ordered set $\{e_1, e_2, e_3, \ldots e_m\}$. m is not the same as q.

Note that while $p_1, p_2, p_3 \ldots p_m$ have contiguous subscripts, this does not mean that these are contiguous positions on an entangled string. The relation of $p_1, p_2, p_3 \ldots p_m$ to each other is not static, but a function of k.

In referring to p, which represents the positional context of the entangled string relative to the input string, p can be broken down as the ordered set $\{p_1, p_2, p_3, \ldots p_m\}$, where each $p_x$ conceptually represents the relative position of that specific character relative to its corresponding character in the original string I. Accordingly, I is represented as the ordered set $\{i_1, i_2, i_3, \ldots i_n\}$, and E is represented as the ordered set $\{e_1, e_2, e_3 \ldots e_m\}$, thus $p_x = g(i_x, e_y)$ where $g(i_x, e_y)$ is a function derived from c(i,k) and d(i, k) for the specific $i_x$, and $$p_x = g(i_x, k).$$

And because n is not equal to m, c(i, k) and d(i, k) produce more than one p for every i, and further, each i will result in more than one t.

While the present modified search function ES produces instructions that will be interpreted by the native search engine, the interpretation of results requires additional steps to map the set of resulting E={$e_1, e_2, e_3, \ldots e_m$} back into cleartext string I={$i_1, i_2, i_3, \ldots i_n$} using $p_x = g(i_x, k)$ and $t_x = v(i_x, k)$. It is noted that the preprocessing component utilizes k as an argument in both c(i, k) and d(i, k).

The "untangling" operation, is represented as:

$$I = U(E, k)$$

$$U(E, k) = r(E_s, p, t, k)$$

$$I = U(E, k) = r(e_{s, 1-m}, p_{1-m}, t_{1-m}, k)$$

$i_{1-n} = h(e_{s,1-m}, p_{1-m}, t_{1-m}, k)$ where for each p, $p_x = g(i_x, k)$ and for each t, $t_x = t(i_x, k)$ creating a mapping back from m into n.

When the native search engine is provided with the following instructions:

Look for any Ex in $\{E_1, E_2, E_3, \ldots\}$ where $t_1$ is found in position $p_1$ or $t_2$ is found in position $p_2$ or $t_3$ is found in position $p_3$ or $t_q$ is found in position $p_q$ within an individual E which is the ordered set $\{e_1, e_2, e_3, \ldots e_m\}$, it returns a set of results which will be in the following entangled form, $R = \{R_1, R_2, R_3, \ldots\}$ where $R_x$ represents one of the individual results. To return the data to the end user in cleartext, each $R_x$ is untangled using U:

$$I_x = U(Rx, k).$$

So, the present data entanglement process outlined so far has the following functions. f(I,k) entangles string/using key k and produces entangled string E. This is in turn comprised of two functions c(I,k) and d(I,k) that confuse and diffuse, respectively. And because the above yields $E = E_b + p + t$, functional relationships between p, t and I, k can be derived via c(I,k) and d(I,k). Further, g(I,k) yields positional context p for input I, and v(I,k) yields term context t for input I. In addition, h(T,k,P) uses key k to translate Search Term T for position P into a set of terms, ES, that can be used by the native search engines. U(R,k) returns cleartext string I from Result R and key k.

b) Attributes of Data Entanglement Functions

Two of the functions discussed above are c(I,k) and d(I,k) that confuse and diffuse, respectively. The confuse function, c(I,k), is a function that takes the input string I and confuses it using key k. The confusion function deployed in the present encrypted analytical vault utilizes multi-dimensional spaces uniquely generated from k to produce $E_c$ and p. This means that the present encrypted analytical vault takes one-dimensional input—i.e., a series of characters in a string where each character has a position that can be specified by one coordinate—and convert it into multi-dimensional output, where each character in the multi-dimensional output has a position that can no longer be specified by a single coordinate, but instead requires a set of coordinates (i.e., one for each dimension).

If the original input string was I, the ordered set is written as $\{i_1, i_2, i_3, \ldots i_n\}$. Once I has passed through c(I,k), it results in a temporary output $\{E_{c1} + p_1, E_{c2} + p_2, E_{c3} + p_3, \ldots E_{cn} + p_n\}$, where each $p_x$ is further made up of dimensional components based on c(I,k). For example, $p_x = (p_{x1}, p_{x2}, p_{x3}, \ldots p_{xw})$, where w is number of dimensions.

In the present encrypted analytical vault, the diffusion function, d(I,k), acts in part independently on the original string, and in part on the output of c(I,k), which is $\{E_{c1} + p_1, E_{c2} + p_2, E_{c3} + p_3, \ldots E_{cn} + p_n\}$. Both aspects can still be stated as a consolidated function d(I,k), where d(I,k) is a function that takes the input string I and diffuses it by using key k, because c(I,k) takes one-dimensional input and produces multi-dimensional output. Using the output from c(I,k) as input for diffusion, also produces a multi-dimensional output. Applying d(I,k) turns each $E_c$ into $E_p + t$.

The transformation for the diffusion process utilizes attributes of the key to produce diffusion along each dimension for each character of the input string I. The resulting entangled string, after the application of c(I,k) and d(I,k), contains key-based confusion, as well key-based diffusion, and presents itself with three components in each dimension relative to a single input character.

As discussed above, $E_c$ and $E_p$ can be represented jointly as $E_b$. So, the input string is transformed as follows:

$$\{E_{b1} + p_1 + t_1, E_{b2} + p_2 + t_2, E_{b3} + p_3 + t_3, \ldots E_{bm} + p_m + t_m\},$$

where m is not equal to n, and $m = n*w$, with w being the number of dimensions. If the input string is expressed in terms of n, it can be written as:

$$\{E_{b1} + p_{11}, p_{12}, p_{13}, p_{1w} + t_{11}, t_{12}, t_{13}, \ldots t_{1w}, E_{b2} + p_{21},$$
$$p_{22}, p_{23}, \ldots p_{1w} + t_{21}, t_{22}, t_{23}, \ldots t_{1w}, E_{b3} + p_{31}, p_{32},$$
$$p_{33}, \ldots p_{3w} + t_{31}, t_{32}, t_{33}, \ldots t_{3w}, \ldots E_{bn} + p_{n1},$$
$$p_{n2}, p_{n3}, \ldots p_{nw} + t_{n1}, t_{n2}, t_{n3}, \ldots t_{nw}\},$$

where w is number of dimensions.

c) Applying Encryption as a Final Step in the Entanglement Process

Once a searchable entangled string is produced using the above method, it can be provided to a search platform for indexing. Indexes are built by fragmenting text strings based on pre-defined searches. For the method described herein, index fragments would be created for the string below:

$$\{E_{b1} + p_{11}, p_{12}, p_{13}, p_{1w} + t_{11}, t_{12}, t_{13}, \ldots t_{1w}, E_{b2} + p_{21},$$
$$p_{22}, p_{23}, \ldots p_{1w} + t_{21}, t_{22}, t_{23}, \ldots t_{1w}, E_{b3} + p_{31}, p_{32},$$
$$p_{33}, \ldots p_{3w} + t_{31}, t_{32}, t_{33}, \ldots t_{3w}, \ldots E_{bn} + p_{n1},$$
$$p_{n2}, p_{n3}, \ldots P_{nw} + t_{n1}, t_{n2}, t_{n3}, \ldots t_{nw}\}.$$

Subsequently, each fragment would be encrypted using encryption, such as symmetric key encryption, prior to storing it in the native search index. This final step improves the overall security of the searchable entangled string and raises it to encryption standards.

C. Entanglement-Based Data Storage and Search

Elasticsearch® is one of the most popular search engines that were written on top of Lucene®. Elasticsearch's wide adoption is also quite diverse. Organizations, large and small, use it for general-purpose search analytics, as the primary backend storage for applications, as a search module in online transaction processing (OLTP) solutions, etc. Elasticsearch® offers a flexible plugin-based extension framework for third parties to augment its behavior. The disclosed encrypted analytical vault may be used for Elasticsearch® to allow customers to deploy, test, and roll out the solution quickly.

According to one embodiment, the disclosed encrypted analytical vault provides a native search plugin such as an Elasticsearch® plugin. A plugin is a small piece of a program that runs within the host application. Delivering it in this form reduces the effort required to introduce the solution. Neither the client application (the one generating queries), nor the storage service (i.e., Elasticsearch®) needs to be modified. The present plugin is installed on all Elasticsearch nodes. After installing the plugin, the customer uses the disclosed encrypted analytical vault per the following steps: (i) create a new ingest pipeline, (ii) start with a new index with mappings (akin to schema) that utilizes the present secure data types described below; and point the data pipelines to the new index instead of the old ones.

There are a number of advantages in delivering it in this form. First, Elasticsearch offers a broader degree of freedom for plugins. Plugins can not only modify the inputs but also influence the search behavior.

Second, customers can quickly install, try, evaluate and purchase these compared to traditional enterprise applications. This approach allows both the vendor and customer to be agile.

Third, since the Elasticsearch® plugin runs within the Elasticsearch® application process, customers do not have to procure separate hardware to host the application.

Finally, it is not uncommon for Elasticsearch® to be running on 100s to 1,000s of nodes. A plugin that runs on that many nodes is not only resilient, but it can also perform a lot of computations in parallel. In other words, an Elasticsearch® plugin instantaneously gets a distributed computing footprint.

The present plugin exploits the constructs of Elasticsearch® to deliver a set of custom data types that are secure with various degrees of searchability.

The plugin disclosed herein may deliver a secure alternative to most of Elasticsearch's native data types such as Keyword, Test, IP, Number, Date, and the like. If a customer finds certain data, such as a "date" field in an index to be sensitive (e.g. the date of birth), they can choose to use the encrypted analytical vault's version of date (i.e., tangled_date) data type instead of Elasticsearch's native date data type.

Additionally, the plugin also offers varying levels of security including tangled, masked, format-preserving equivalent, and redacted.

Each Elasticsearch® index consists of a collection of source documents and each source document consists of a set of fields. The source document is the most visible part of the Elasticsearch® index. When Elasticsearch® returns search results, it returns a set of source documents. The entire source document is the default response unless the enterprise specifically chooses a subset of select fields from it.

When a field is secured through the present plugin, it intercepts the ingest process and prevents the raw plaintext data from being stored in the document. Rather it tangles the data upfront even before Elastic persists the data. Therefore, the plugin ensures that the document never exposes the sensitive data in plaintext in the fields it secures. Further, the plugin also chooses the most secure form of the tangled text, referred to as "shuffled tangled text", to store in the source document.

Later, when a client searches for data, the plugin intercepts the Search Term and converts the Search Term to tangled form and hands it over to Elasticsearch®, and lets Elasticsearch® carry out the search. Subsequently, when results are sent back, if the client is authorized, the plugin translates back the results to plaintext. In some cases, the plugin also changes the search logic to accelerate search performance for encrypted index. For example, in order to perform a wildcard search, the plugin also stores additional tangled and encrypted fragments and conducts prefix searches on the fragments.

As stated above, the plugin will only respond to authorized clients. In order to support this, the plugin can verify the client using a number of mechanisms such as bearer token, a certificate, etc. This way enterprises can make sure that the sensitive data do not reach the hands of those that should not have access to it.

Tangled data types are the most helpful with analytical tasks. Tangled data types support most of the searches, sorts, and aggregations without significant overhead in performance. By way of example and not limitation, tangled IP supports term search (e.g., exact match and classless inter-domain routing (CIDR)) and range search; tangled text supports match, match prefix, and match phrase prefix searches; tangled keyword supports term and prefix search; and tangled tiny keyword (up to 32 characters) supports wildcard searches.

To support prefix search, the plugin may store the forward tangled value as a hidden field outside of the source document.

To support suffix search, which in Elasticsearch® corresponds to wildcard searches with an asterisk at the beginning, the plugin may store the reverse tangled value as a hidden field outside of the source document. Any suffix search request is then catered by doing a prefix search query on this field.

To support wildcard search, the plugin may break down the forward tangled field into multiple fragments and encrypt and store the individual fragments in specific pre-provisioned fields. Later, when a client requests a wildcard query, the plugin (using the engine) may generate a set of search patterns that translates the wildcard search into a boolean prefix query. This makes the wildcard search on a tangled keyword field faster compared to wildcard search on a regular keyword field.

Securing IPs, numbers, and dates in a searchable manner introduces a general challenge because these data types employ a small subset of characters from the 100s of 1000s of characters in Unicode specs. With such a small diversity in characters, it is challenging to produce secure equivalents that are searchable, sortable, and aggregable without compromising the original values.

While ingesting paragraphs of text, the disclosed encrypted analytical vault splits paragraphs into words based on common delimiters or other similar criteria, and performs prefix, suffix, or term searches on individual tokens. In addition to the above, the disclosed encrypted analytical vault performs the following:
1. Instructs the text tangling engine to exclude certain character classes from the 13 characters used to represent entangled data. These character classes contain the characters that Elasticsearch® (ES) uses in tokenization as separators.
2. Creates a new field type "Tangled_Text".
3. Ingests the cleartext string.
4. Identifies all segments that do not have excluded characters, and sends the identified segments to the engine to be tangled.
5. Reassembles the string by leaving the special characters in their original position and by replacing the rest of the segments with their tangled counterparts.
6. Creates a reverse string where each tangled segment uses the reverse tangled output from the engine. The string is actually a forward string, however, each segment will have the reverse tangled string in place of the forward tangled string.

An example is provided below for cleartext "Arti is amazing" with Arti, is, and amazing being the segments to be tangled. The tangled output for each segment would be as follows:
a. For segment Arti, forward is fghgytujkhgd, and reverse is ghjdfagfhjkjh.
b. For segment is, forward is ghfjhk, and reverse is hgjkjh.
c. For segment amazing, forward is asdfdgshgfdhjhgddgsh, and reverse is kjhggdhsjfgsdagfhfjag.

Consequently, the following strings are sent to the search engine (Elasticsearch®, Opensearch®, etc.) for indexing: fghgytujkhgd ghfjhk asdfdgshgfdhjhgddgsh for prefix search, and ghjdfagfhjkjh hgjkjh kjhggdhsjfgsdagfhfjag for suffix search.

Subsequently, the search engine is instructed to process each of the above strings and utilize native match queries on tokenized values. In some embodiments, the forward tokenized string is used for the prefix and term search while the reverse tokenized string is used for the suffix search.

It is to be noted that, while the general process for entanglement-based storage and search is described, the disclosed encrypted analytical vault is not limited to certain specifications described herein. As described in greater detail below, the disclosed encrypted analytical vault has many other applications, which render it a unique storage tool for enterprises and many other organizations.

D. Types of Data Stored in the Vault

The encrypted analytical vault supports various data types for storage and index-based search. According to some embodiments, the supported data types include, but are not limited to, primitives, binary, documents, and the like. The primitive data may include keywords (e.g., small text), text (e.g., paragraphs), numbers (e.g., integers, floats of varying sizes), IP addresses (e.g., IPv4 addresses and IPv6 addresses), date (date only or date and time), geodata (e.g., points and shapes that provide geographic location information), and so on. The binary data may include files like excel files, PDF files, zipped files, images, audios, videos, etc. The documents may include JavaScript® object notation (JSON) documents that include the above field types, such as an employee document with name (keyword), salary (number), and a PDF copy of work authorization (e.g., SSN/passport).

In some embodiments, based on the stored data types, the encrypted analytical vault may allow different types of data fetching and searching to be implemented in the vault. For instance, values that can be used for searching data in the encrypted analytical vault may include, but are not limited to, 1) term (exact match), prefix, suffix, and wildcard search on keywords, 2) an exact match, match phrase, match phrase prefix, and match phrase suffix searches on text, 3) term and range searches on date and number, 4) term and CIDR search on IP addresses, and 5) distance or proximity searches including search on geodata.

In some embodiments, metadata may be also used by the disclosed encrypted analytical vault in data search. For instance, certain attributes related to stored data may be used for search. By way of example and not limitation, the user who has created or edited data, the data creation and/or edit timestamps may be used for implementing a search. Other metadata-based searches may include certain smart metadata derived from the stored data, which can also be used for searching with or without combination with other data information. Such smart metadata may include file type, file size, file characteristics (such as image size, video length, etc.) that may be automatically detected from the stored data.

In some embodiments, the disclosed encrypted analytical vault may allow a search to be implemented by tags or other attributes of the stored data. These tags and attributes may include text, time stamps (e.g., when a video was recorded), location (e.g., where a video was recorded), and so on. In some embodiments, the tags and attributes may be specifically added by the owners before the data is stored. In some embodiments, these tags and attributes may be automictically extracted from the actual content of the data. For instance, certain binary files, such as PDF files and Microsoft® Office files, may have some content that is useful for search. The encrypted analytical vault may thus automatically extract text from these files and create tags using the extracted text, which can be subsequently used to conduct searches by these tags.

In some embodiments, the disclosed encrypted analytical vault may implement a faceted-based search. Faceted search is a technique that involves augmenting traditional search techniques with a faceted navigation system, allowing users to narrow down search results by applying multiple filters based on faceted classification of the items. An example of a faceted-based search includes, but is not limited to, a search for employees from California or New York (here the first facet is state) who make more than a quarter-million dollars in salary (here the second facet is salary) that joined in the last 5 years (here the third facet is tenure) may be such faceted-based search.

In some embodiments, to allow different types of data to be stored and/or further searched, the disclosed encrypted analytical vault may be configured to incorporate different protocols or application interfaces. Exemplary protocols or interfaces used by the disclosed encrypted analytical vault may include, but are not limited to, JSON over representative state transfer (REST), SQL interface, Mongo® wire protocol, and Redis® interfaces. Here, JSON is a lightweight data-interchange format that is readable and is easy to parse. JSON is based on a subset of the JavaScript programming language. REST is a client-server architectural style that uses the HTTP protocol in a simple and effective way. SQL is a programming language for managing relational databases (e.g., ODBC/OLEDB, SQL), and is used to query the data that is organized into tables and sub-tables. Open database connectivity (ODBC) refers to a standard API for accessing a SQL database management system, and object linking and embedding database (OLEDB) is a deprecated Microsoft® API that allows access to any data from a variety of sources in a common way. Mango® wire protocol, or MangoDB® wire protocol is a simple socket-based, request-response style protocol that allows clients to communicate with a database server through a regular TCP/IP socket. Redis® interface is an interface for inspecting, visualizing, and manually updating data stored in Redis® databases. Redis® is an open source (e.g., Berkeley software distribution (BSD) licensed), in-memory data structure store that provides data structures such as strings, hashes, lists, sets, sorted sets with range queries, bitmaps, HyperLogLogs, geospatial indexes, and streams. Redis® has built-in replication, Lua scripting, least recently used (LRU) eviction, transactions, and different levels of on-disk persistence, and provides high availability via Redis® Sentinel and automatic partitioning with Redis® cluster.

In some embodiments, the disclosed encrypted analytical vault allows the stored data to be read with any of the aforementioned protocols or interfaces irrespective of how the data was written in the first place. In other words, the stored data may be read regardless of the protocol used to write the data in the vault, as the data may still be read using one of the aforementioned interfaces or protocols.

E. Encryption Keys

In some embodiments, the disclosed encrypted analytical vault implements a robust mechanism to supply, store, rotate, phase-out, and/or remove strong encryption keys in managing the data stored in the vault. These encryption keys may be provided by the clients, or may be automatically generated by the vault if not provided by the clients.

In some embodiments, the encryption keys managed by the encrypted analytical vault may have different granularities. That is, the encryption keys may be specified at varying levels of granularity, such as system level, logical vault level, collection level, field level, and so on. This allows customers to supply different keys for different data classifications and enforce independent key life cycles (e.g., key rotation, key sunsetting). For example, filed level keys may be used to decrypt certain fields, while collection-level keys may be used to decrypt certain collections.

In most cases, customers supply strong encryption keys for the encrypted analytical vault. However, these encryption keys are not directly used by the encrypted analytical vault to encrypt the stored data. Instead, the encrypted analytical vault generates derivation keys—the actual encryption keys used to encrypt the stored data—based on the encryption keys supplied by the customer and other variables, such as collection name and/or field name and the like. Consequently, even if the attackers are able to somehow access both the cipher text and the encryption keys from the customers, they would still be unable to decrypt the cipher text into cleartext due to the fact that the key derivation logic is proprietary to the decryption analytical vault, which is not accessible to the attackers.

In some embodiments, an additional layer of security may be further implemented by the encrypted analytical vault by using a seed, supplied and controlled by the customer, in generating the derivation key for encryption. For example, the seed provided by the customer may be used as a startup argument, which is not maintained by the encrypted analytical vault. The seed can be one of the inputs in an existing derivation logic. For example, when the seed is supplied by the customer, the encrypted analytical vault uses the seed to produce a derivation key that is subsequently used to cipher the text. The resulting cyphertext cannot be decrypted by another encrypted analytical vault without the seed or with a different seed. Accordingly, if an attacker was able to obtain the cipher text, the encryption key, and an independent encrypted analytical vault instance, he/she would still be unable to decrypt the cipher text into cleartext without knowing the seed.

In some embodiments, an additional layer of security may be implemented by the encrypted analytical vault by generating a master key for the encryption keys. A master key is a key to encrypt the data encryption keys. In some embodiments, a master key can be frequently changed (e.g., once an hour, once a week) to further improve security. Changing the master key simply requires one to re-encrypt the data encryption keys using a new master key to replace the existing one. The change of the master key doesn't affect the data encryption keys encrypted by the master key. Changing the master key is also referred to as rekeying.

In some embodiments, the data encryption keys themselves may be also changed. The change of the data encryption keys may be referred to as key rotation, to differentiate it from the rekeying process for the master key. In strong cryptographic applications, data encryption keys may be periodically rotated (e.g., every 3 months to every 3 years). In practice, many regulatory requirements such as compliance with payment card industry data security standards (PCI-DSS) require key rotation.

In general, key rotation may be implemented by encrypting all new data (e.g., data stored after a previous key rotation event) using the new key while the old data (e.g., data stored before a previous key rotation event) remains unchanged (e.g., remaining encrypted with the old key(s)). The rationale behind this practice is that compromise of any one key (either new key or old key(s)) does not compromise all the data since different keys protect different sets of data. However, in practice, this kind of key rotation is at odds with search, since an index or a collection that supports search is expected to be encrypted using a single encryption key. To address this concern, the disclosed encrypted analytical vault may partition the data encrypted with different keys, federate the query across different partitions, and then merge the results from different partitions before presenting the obtained data to the client.

F. Data Sharing

In order to conduct business, the data protected in the encrypted analytical vault needs to be released/shared within and outside an organization under certain circumstances. Encrypted analytical vault may employ different approaches to safely share data stored in the encrypted analytical vault.

According to one embodiment, the disclosed encrypted analytical vault may allow administrators to create release schemas in data releasing and/or sharing. In the event that each collection supports multiple release schemas, the disclosed encrypted analytical vault may also allow an administrator to determine how each field should be formatted before data is released. A client application may request data from a collection to be released conforming to the release schema specified by the administrator.

Figure 1:
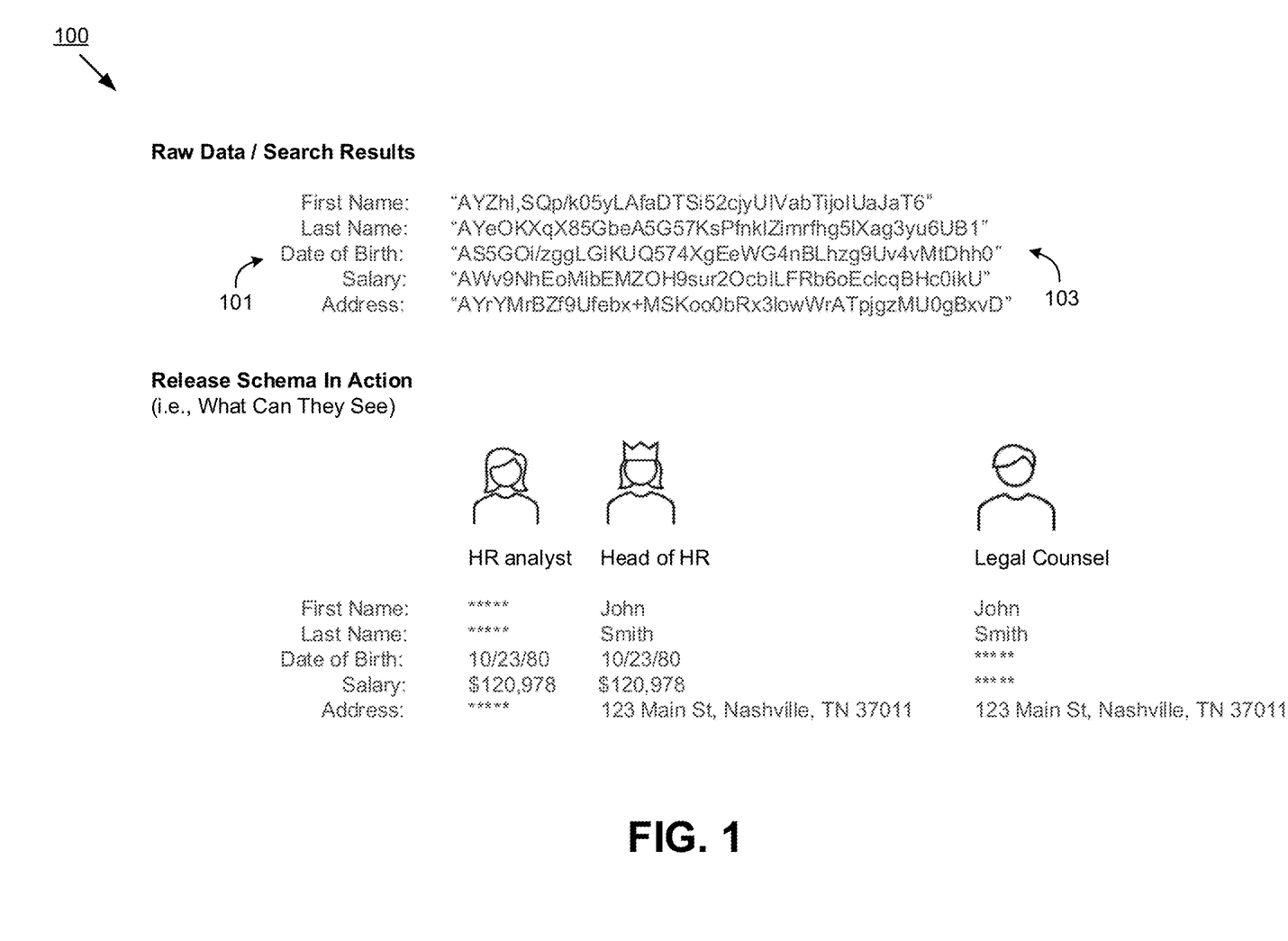
FIG. 1 illustrates a data releasing scenario, according to some embodiments of the disclosure.

FIG. 1 illustrates an exemplary data releasing scenario 100, according to some embodiments of the disclosure. As illustrated in the figure, there are two parts: raw data/search results and release schema in action. For raw data or search results, it means that the data is stored in the encrypted format for the sensitive information included in the data. As can be seen, for a collection 101 that includes the first name, last name, date of birth, salary, and address for an employee in an enterprise, the sensitive information for the collection is stored as the encrypted data 103 in the encrypted analytical vault. To release the data (e.g., when delivering a search result in response to an inquiry), different schemas may be used according to the person who requests the data. For example, when the collection is released to a human resource (HR) analyst, the fields required for analysis are visible but the identity of the person, including the first name, last name, and address is masked. Similarly, when the collection is released to a legal counsel, only name and contact information (e.g., address) are visible in clear, but the salary and birth date are masked. On the other hand, when the collection is released to the head of HR for executive view, all the five fields are visible in clear.

In some embodiments, the disclosed encrypted analytical vault may apply certain customized anonymization methods to further define the release schema. For example, one or more extension programs may be implemented as release schema plugins and can be registered. These extension programs may convert a field (e.g., date of birth) into certain range values (e.g. 0-10, 11-20, 21-30, 31-40, 41-50, 51-60, . . . ). The data released this way is suitably anonymized, but still can be used in data analysis (e.g., in machine learning-based processing).

Under certain circumstances, cleartext data has to be released for further analysis in spreadsheets. This requires the vault to allow structured data to be downloaded as a file, such as a comma-separated values (CSV) file or an Excel file. Before the data leaves the vault, the output can be first secured using a customer's preferred digital rights management (DRM) solution and then the DRM protected output can be released from the vault. This way the data released from the vault can only be consumed by the intended party in an intended manner. The disclosed encrypted analytical vault may allow this to happen using vault plugins, as further described in detail below.

In one application scenario, such vault plugins may allow a vault to vault data transfer. In business, there is a strong need to safely share sensitive data with related and third parties. For instance, blueprints are to be shared with contractors, and customer lists are to be shared with business partners and affiliated parties. Oftentimes, the data is downloaded as a report (e.g., in CSV, PDF, or other formats) and shared by email with the content as an attachment. However, if implemented this way, once the data is sent out, the sender has little control over how the data is used.

The disclosed encrypted analytical vault may address this concern by offering a seamless way to share sensitive data with related parties without losing control of the released data. That is, the sender can still explicitly control the encryption keys even after the data is released to the related parties. This way the related parties can query the data and use it as intended. But if the data owner or sender suspects anomalous behaviors when the data is being used, the data owner or sender may suspend the key while they are investigating the anomalous behaviors.

Figure 2:
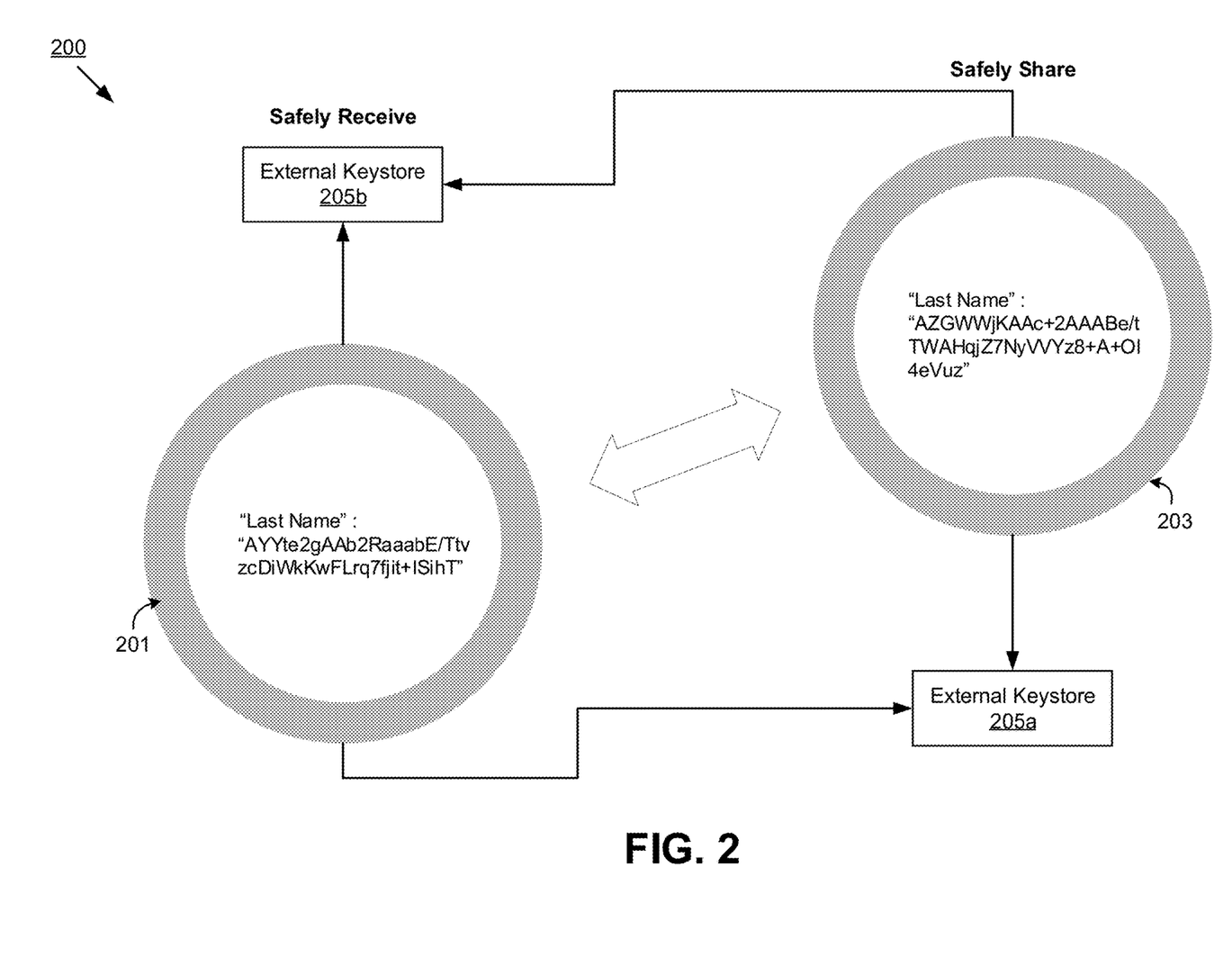
FIG. 2 illustrates a vault-to-vault data transfer scenario, according to some embodiments of the disclosure.

FIG. 2 illustrates an exemplary vault-to-vault data transfer scenario 200, according to some embodiments of the disclosure. As illustrated, there are two encrypted analytical vaults 201 and 203. For interpretation purposes, vault 201 may be considered as a source vault or the vault associated with the data owner, while vault 203 is considered as the third-party vault or the vault associated with clients. Before the vault-to-vault transfer, the source vault may encrypt to-be-transferred data using the specific keys, which may be controlled by the data owner. The encrypted data may be transferred from source vault 203 to third-party vault 203. During the data transfer process, the encryption key associated with the data may be shared from source vault 201 through an external keystore 205a or 205b, which is also accessible by third-party vault 203. Third-party vault 203 may then serve the data to its clients using the encryption key associated with the data. The data may be served to the clients by third-party vault 203 like any other data or collections, except that the key associated with the data is still controlled by the data owner. For instance, the data owner may still check whether there are anomalous behaviors from the clients using the data, and may revoke the encryption key associated with the data at any time in situations when there are any suspicious activities.

In some embodiments, the vault-to-vault transfer may include a decryption and re-encryption process, and thus for a same input data, the encrypted data from a receiving vault is different from the encryption data from a sending vault, as can be seen in FIG. 2.

Under certain circumstances, sensitive data stored in the encrypted analytical vault needs to be released in cleartext for special projects like building a machine learning (ML) model. For that purpose, data is expected to be placed in a location such as an object store (e.g. S3 bucket) or Hadoop® distributed file system (HDFS), where proprietary ML code can read and process the data. Regardless of the query capabilities built into the encrypted analytical vault, the data needs to be released in its entirety for data processing by the ML code. To achieve this without exposing the sensitive information associated with the data, the encrypted analytical vault may allow data to be queried using the most common client interfaces and protocols such as S3a or DFS protocols. In this approach, the encrypted analytical vault can be treated like S3 bucket or HDFS file system.

Another approach is to release the data in cleartext to a location where it can be further processed. The disclosed encrypted analytical vault may achieve this based on a walled garden arrangement. A walled garden refers to a limited set of technology or media information provided to users with the intention of creating a monopoly or secure information system. In some embodiments, requests for data in cleartext are achieved through warrants. Authorized clients can furnish a warrant which specifies what data needs to be provisioned, in which environment, and for how long. The data may be only used in situations where the conditions under the warrants are satisfied.

G. Plugin Framework

In some embodiments, the disclosed encrypted analytical vault may support extensibility using a plugin framework for data ingest and export. That is, when data is ingested into the vault or exported out of the vault, the data may be piped through one or more plugins arranged in the form of a data pipeline.

When ingesting data, these ingest plugins may pre-process, reformat, and rearrange the incoming data. For instance, the ingest plugins may process the data with machine-learning algorithms to add sensitivity scores, or extract information such as metadata associated with the data and store the extracted information securely in a separate vault collection for search and retrieval. In one example, when a binary file (e.g., a video file or image) is uploaded, an ML model may run against the binary file to extract subjects (e.g., cat, dogs, scene, building, etc.), location information (e.g., street intersection, living room, etc.) and so on, which can be stored as tags on the data or as structured data on a separate index. In another example, many file formats, such as JPEG and MP4 files, contain file headers, which can be also extracted and indexed for searching.

When exporting data, the plugins may format the released data into formats that the clients can easily consume, such as proprietary encoding, adding compression to save the data size, and so on. In some embodiments, the plugins may also transform the data before data release. For instance, an export plugin may add DRM protection to the released data, to ensure that the exported data can only be consumed by the target client in an intended manner.

H. Bring Your Own Key (BYOK)

Business-to-Business Software as a Service, or B2B SaaS companies, refer to businesses that provide software solutions as a service to other businesses. Corporations need software for accounting, word processing, managing customer relationships (CRM), developing and optimizing organizational procedures, monitoring and surveillance, and so on. B2B SaaS companies offer cloud-based solutions to enterprises. They develop, create, update, and render applications from a hub, which are remotely accessible to organizations (their customers) via the cloud, which consists of servers provided by SaaS companies. B2B SaaS companies offer subscription plans to enterprise companies. Companies subscribe and pay a monthly, or yearly subscription fee to avail and make use of these cloud-based solutions. B2B SaaS is highly coveted during the recent shift from working in an office to working from home, since such B2B SaaS is able to offer a number of advantages, such as single code line, better visibility into customers' usage, activity and challenges, and ability to innovate faster. And the market rewards all this well by bestowing higher valuation.

A key challenge for B2B SaaS is convincing their customers—especially the large marquee customers in regulated industries such as banking, finance, healthcare, and government—that the customers' data is properly and adequately secured against threats. Most customers demand that the SaaS vendor uses separate encryption keys for their data, and further, that they have control of those encryption keys. SaaS vendors refer to this as "bring your own key (BYOK)" approach customers are allowed to bring their own encryption keys. However, in existing B2B SaaS applications, it is difficult to make changes to SaaS software to accommodate such requests and, at the same time, support key rotation.

According to some embodiments, the encrypted analytical vault allows SaaS vendors to implement BYOK with minimal effort. For example, the disclosed encrypted analytical vault may support creating separate logical vaults and separate collections within each logical vault. Encryption keys are provided at varying levels of granularity as previously described. SaaS operator may simply switch the backend store to the encrypted analytical vault and move the customer's data to a separate vault or index and let the customer supply their own keys. The application can be agnostic to the fact that data is even being encrypted or the fact that each customer controls their own keys.

Figure 3:
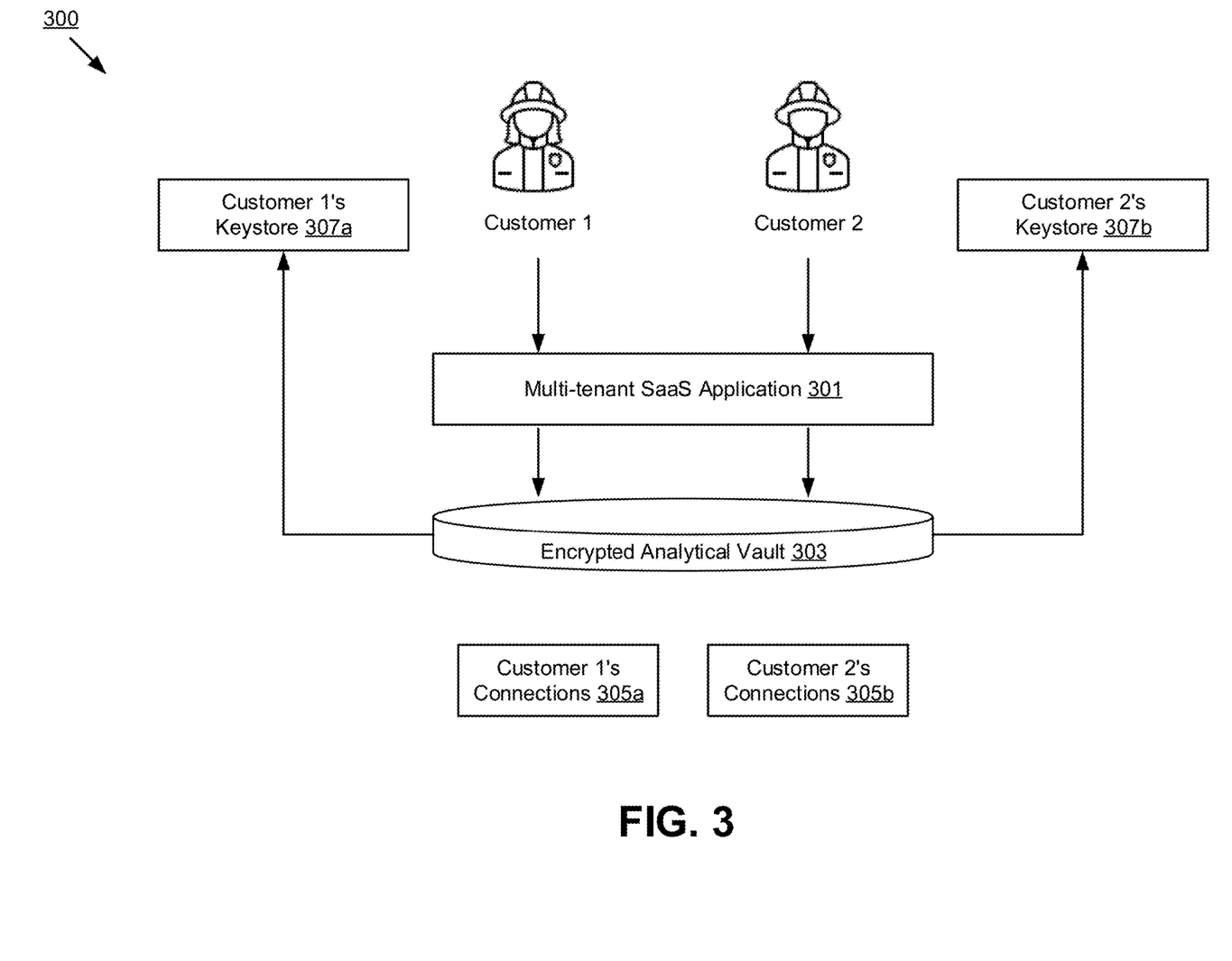
FIG. 3 illustrates an application scenario for bring-your-own-key (BYOK)-based encrypted analytical vault for SaaS applications, according to some embodiments of the disclosure.

FIG. 3 illustrates an exemplary application scenario 300 for BYOK-based encrypted analytical vault for SaaS applications, according to some embodiments of the disclosure. As described earlier, in the disclosed encrypted analytical vault, encryption keys may be read at varying granularities and from multiple locations. So logical vaults or collections belonging to two different parties can be encrypted using keys that the data owner controls. As illustrated in FIG. 3, a multi-tenant SaaS application 301 may be associated, for example, with two customers, customer 1 and customer 2. Association with a larger number of customers is also possible and within the spirit and the scope of the disclosure. Through the SaaS application 301, the customers 1 and 2 may perform data processing e.g., data storage, through the encrypted analytical vault 303 as illustrated in FIG. 3. The data may be stored in encrypted format and the encryption keys for each customer may be stored in a respective customer keystore 307a or 307b, which allows each customer to independently control their own keys through their own respective connections 305a or 305b.

The application scenario illustrated in FIG. 3 shows certain advantages over existing B2B SaaS applications. First, as described above, the customers may store encrypted data in the B2B SaaS applications by controlling their own encryption keys. Second, the customers, due to the inclusion of the vault, may easily rekey and revoke the encryption keys independently. Third, SaaS operators may only store encrypted data, which can easily address the security concerns from the large marquee customers in regulated industries. Fourth, exfiltration and warrants cannot access data in cleartext. Data exfiltration refers to data extrusion, data exportation, or data theft, all of which are considered as an unauthorized transfer of data.

In some embodiments, besides the standalone encrypted analytical vault itself, other vault-related offerings, such as the plugins for big data stores (e.g., Elasticsearch®, OpenSearch® Mongo®) and S3 bucket Proxy for S3 storage, may facilitate BYOK for the respective data stores. Therefore, a SaaS vendor may roll out BYOK on these vault offerings, irrespective of where the SaaS vendor stores the data. The specific applications of vault offerings in SaaS are further described in view of an example encrypted analytical vault-based S3 Proxy, to explain how BYOK is enabled for a popular data source such as AWS® S3.

The background and requirements for BYOK in AWS® S3 can be summarized as follows: i) Data belonging to the customers is stored in an object store such as AWS® S3, Azure blob, Google® Cloud Storage (GCS), Minio®, etc.; ii) data is encrypted using the customer-controlled encryption keys (BYOK), which also enables search on encrypted data including metadata; iii) the application should be easy to implement, e.g., without requiring much code change for the existing SaaS applications; and iv) the application should allow customers to easily supply and/or revoke encryption keys. In summary, the challenge is that the SaaS vendors need to write customers' files to an S3 bucket, encrypt each customer's data with a different encryption key associated with each customer, and allow the customers to control their keys.

Figure 4A:
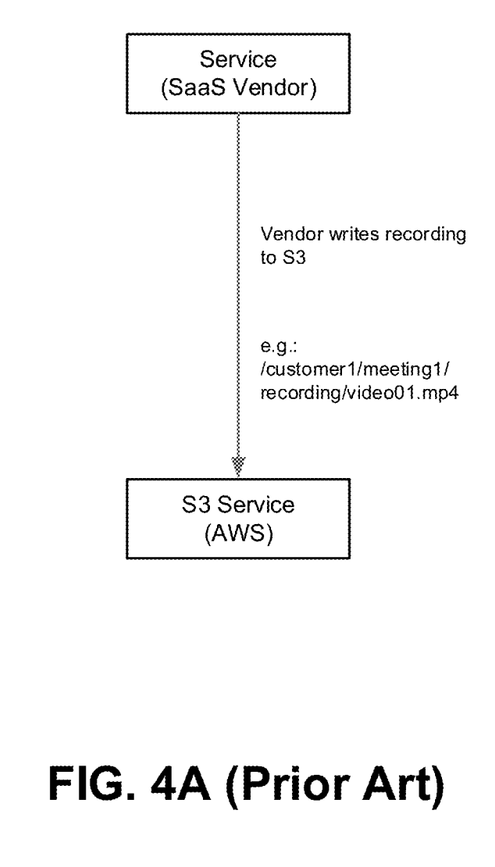
FIGS. 4A-4B collaboratively illustrate exemplary data storage in existing business-to-business (B2B) software-as-a-service (SaaS) applications, according to some embodiments of the disclosure.
Figure 4B:
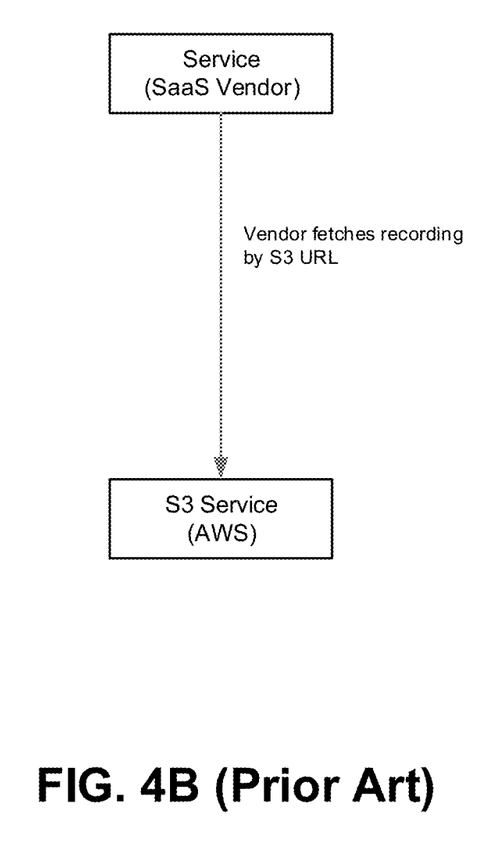

According to the current practice of data storage in existing B2B SaaS applications, to write the data, the SaaS vendor just writes the data (e.g., records the data) to the S3 storage and stores it in the customer's folder—e.g., customer1/meeting1/recording/video01.mp4, as illustrated in FIG. 4A. To read the data, the SaaS vendor simply fetches the data (e.g., the recording) from the S3 storage. The data may be fetched by using the corresponding S3 URL, as shown in FIG. 4B. As shown in FIGS. 4A and 4B, the data is stored in the object store without encryption, which may render certain clients resistant to store their data by the SaaS vendor. In contrast, the inclusion of the encrypted analytical vault allows the data to be encrypted during the storage process, as described in greater detail below with reference to FIGS. 5A and 5B.

Figure 5A:
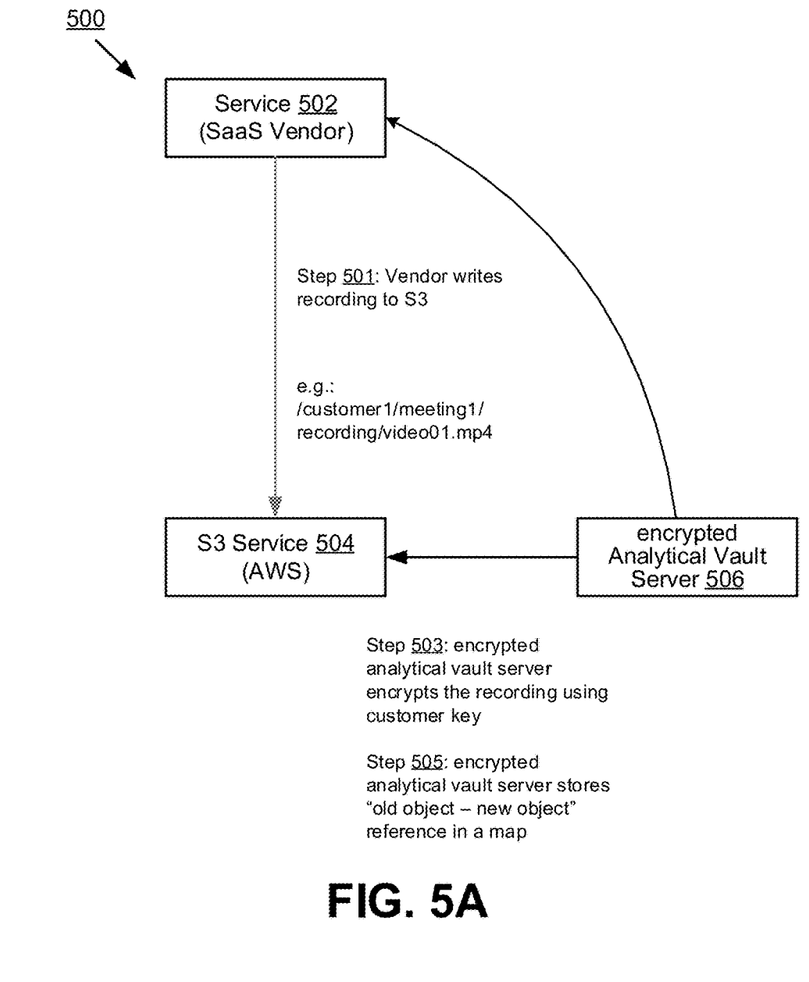
FIG. 5A illustrates a data write process for a SaaS-based storage system having an encrypted analytical vault, according to some embodiments of the disclosure.

According to some embodiments, FIG. 5A illustrates an exemplary data write process 500 for a SaaS-based storage system with an encrypted analytical vault. As shown in FIG. 5A, the SaaS vendor 502 may provide software application services to clients and may elect to store data of the clients to a cloud service provider, such as an S3 service provider 504 like Amazon Web Service (AWS®). During storage, vendor 502 may write/record the data to S3 storage 504. The data are written to the client's folder along a path: /customer1/meeting1/recording/video01.mp4. With the inclusion of the encrypted analytical vault in the system (e.g., by implementing encrypted analytical vault server as an S3 proxy), the encrypted analytical vault server 506 may intercept the stored data, and encrypt the data using the customer key by communicating with SaaS vendor 502 (step 503), and subsequently store the encrypted data in S3 store 504. During the storage of the encrypted data, an "old object-new object" reference is generated by the encrypted analytical vault and stored in a reference map as shown in step 505.

Figure 5B:
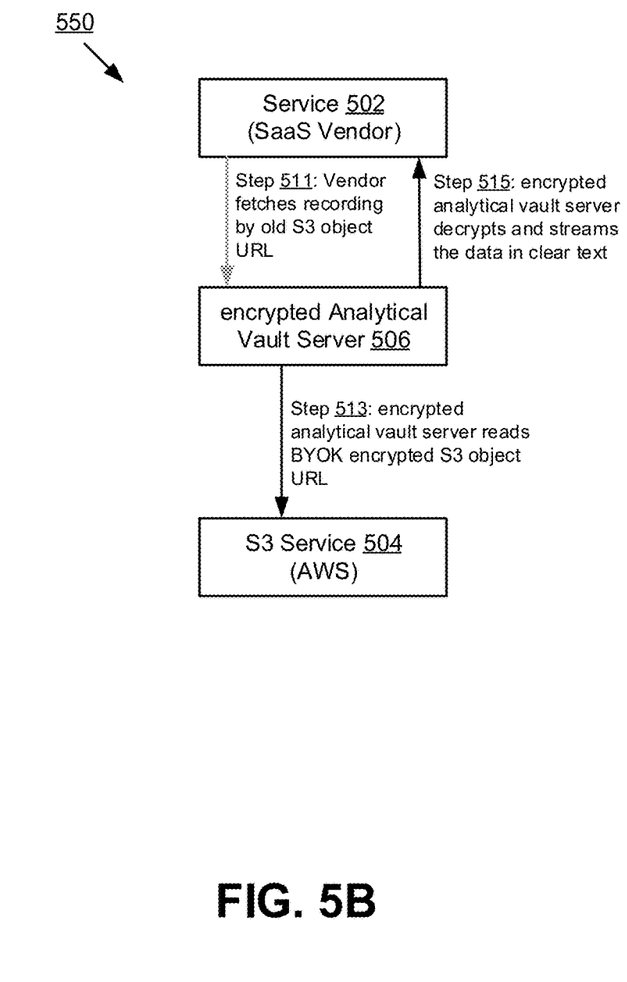
FIG. 5B illustrates a data read process for a SaaS-based storage system having an encrypted analytical vault, according to some embodiments of the disclosure.

According to some embodiments, FIG. 5B illustrates an exemplary data read process 550 for a SaaS-based storage system with an encrypted analytical vault. The read process reads the data stored with the write process illustrated in FIG. 5A. In step 511, the SaaS vendor 502 fetches the data (e.g., the recording) by the old S3 object URL (e.g., /customer1/meeting1/recording/video01.mp4). The encrypted analytical vault server 504, which may be implemented as an S3 proxy, receives the data fetch request. In step 513, the encrypted analytical vault server 506 reads BYOK-encrypted S3 object from S3 store 504. In step 515, the encrypted analytical vault server 506 decrypts the encrypted data obtained from the S3 store 504 and returns the data back to SaaS vendor 502 in cleartext.

In FIGS. 5A and 5B, the encrypted analytical vault server is implemented as an S3 proxy, which allows data to be written and read in the encrypted form without changing the application of the SaaS and/or the S3 store. As an S3 proxy, the encrypted analytical vault server seamlessly encrypts the data with a customer-specific key. In addition, like other encrypted analytical vault-based applications, the customer is provided with an interactive dashboard and periodic reports, which contain important information, such as who accessed what data and with what key. The SaaS-based service may also allow a customer to easily revoke and re-invoke their keys, as in other encrypted analytical vault applications described earlier.

I. Valet Keys

Under certain circumstances, a data owner may hope to allow someone else, e.g., a third-party user such as a consultant or buyer to be able to search through their sensitive data and find a set of records that they are interested in, but the data owner can still control decryption of the data. That is, while the data is searchable by a third-party user, the data decryption is still under the control of the data owner.

In one example, a data provider such as Dun & Bradstreet® or ZoomInfo® may sell certain data to their customers, which then allows the customers to query the data by various dimensions. The data owner may even allow the customers to select a subset of the data and buy the selected data. The data owner may render the data in cleartext when delivering it to the interested customers. In another example, a company that outsources critical consulting activity such as compensation analysis may want to share HR data with consultants in such a way that the consultant can slice and dice the data without being able to see it in cleartext. In these situations, the data owner may transfer their data to an encrypted analytical vault installed for a third party and share a valet key with the third party, which may enable the third party to search the data but not see it in cleartext. In some embodiments, on a more controlled basis with approval workflows, the data owner may allow the third party to translate a subset of records or a subset of fields into cleartext based on their entitlements.

J. Secure Offline Search

In some embodiments, the disclosed encrypted analytical vault releases data in different formats. Some of these formats are used to build an offline index to conduct offline searches, as described in detail below.

One of the data formats released by the encrypted analytical vault is compact keyword, which, according to some embodiments, encrypts the data while at rest in the encrypted analytical vault. That is, the output data include certain compact keywords, which support term, prefix, and suffix searches up to a predefined number of characters, such as the first 16 character prefix search. However, the data release format does not support wildcard search, according to some embodiments. By trading off the wildcard search and limiting the number of characters of the search, this format is both performance and storage optimized. The process of generating compact keywords is reversible.

Another data format released by the encrypted analytical vault is the tangled hashed keyword. Tangle is an iterative one-way hash function designed for security, efficiency, and simplicity. As the name suggests, the tangle hush function uses a strong cryptographic hash and is irreversible. It supports everything that compact keyword supports.

The third format includes format-preserving equivalents. This allows to store the output from the encrypted analytical vault in other databases without making schema changes. These format-preserving equivalents may allow exact match search.

When a client performs a search on the data stored offline, the client may request the encrypted analytical vault to translate the Search Term to a suitable format based on the format in which the data is released from the vault. The client may then perform a variety of searches using the translated Search Term on its database, and find the record without further consulting the encrypted analytical vault that releases the data into the database of the client. Based on the released form of the data, the search result may be presented to the client in the released form, which means that the client may not necessarily see the search result in the cleartext.

K. Performance and Horizontal Scaling

Currently, data storage service providers aspire to fast writes and efficient query performance and horizontal scalability that is required to build web-scale applications. The encrypted analytical vault disclosed herein delivers both attributes despite the rigorous data protection standards.

Figure 6:
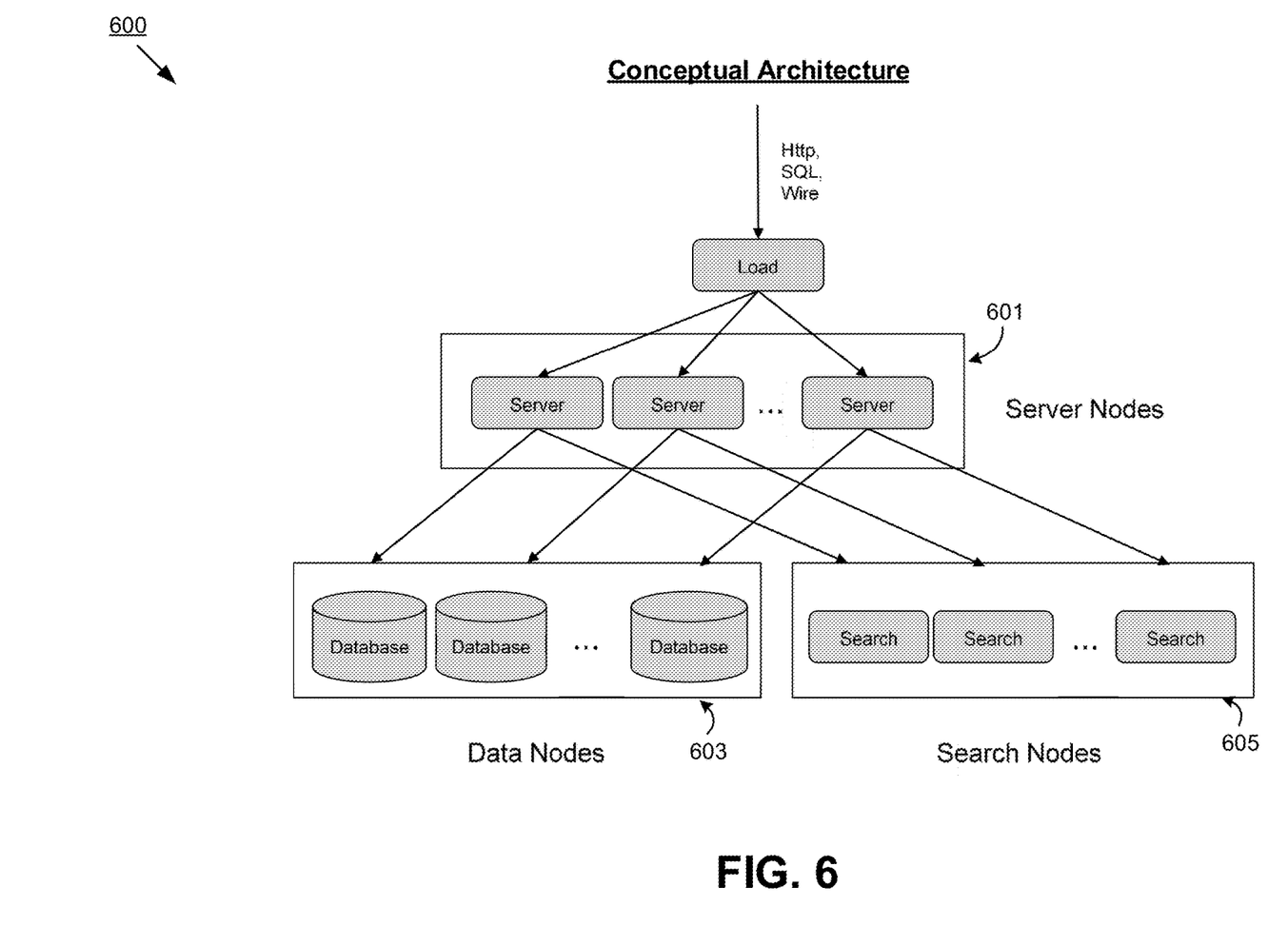
FIG. 6 illustrates a conceptual architecture for a scale-up encrypted analytical vault, according to some embodiments of the disclosure.

To deliver such services, the encrypted analytical vault is configured to include a set of external facing web servers with multiple types of listeners (e.g., HTTP, SQL, wire, etc.), as illustrated by server nodes 601 of conceptual architecture 600 in FIG. 6. These servers may receive data and store the data in multiple databases 603. In addition, the set of servers may also send the data to a distributed search engine 605 for the data to be indexed and searched. In some embodiments, the data stored in the architecture 600 may be also replicated for resiliency and constantly redistributed across nodes for fast retrieval. Data resiliency refers to data's ability to "spring back" in situations where it is compromised.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for data storage in an encrypted analytical vault, the method comprising:
   receiving data for storage in a persistent data store associated with the encrypted analytical vault;
   applying a data entanglement process on the data prior to encryption to obtain entangled data, wherein the entangled data include an entangled string that, when examined by itself, does not divulge a corresponding original string included in the data; and
   encrypting the entangled data; and
   storing the encrypted data in the persistent data store associated with the encrypted analytical vault, wherein the encrypted data is searchable using a native search engine,
   wherein the data entanglement process includes a key-based confusion process configured to obfuscate the data by converting positional information of the data into a multidimensional output where positional information of each character included in the data is represented by a set of coordinates.

2. The method of claim 1, wherein the entangled data is encrypted with an encryption key using symmetric key encryption.

3. The method of claim 2, wherein the encryption key is generated based on a seed provided by a data provider associated with the data.

4. The method of claim 2, wherein the encryption key is derived from an encryption key provided by a data provider associated with the data.

5. The method of claim 2, wherein the encryption key is controllable by a data provider associated with the data.

6. The method of claim 1, wherein the entangled data is encrypted with a set of encryption keys, wherein the set of encryption keys have varying levels of granularity.

7. The method of claim 6, wherein the set of encryption keys are further encrypted using a master key.

8. The method of claim 1, further comprising:
decrypting the encrypted data and re-encrypt the decrypted data with a salt.

9. The method of claim 8, further comprising:
transferring the re-encrypted data to a different encrypted analytical vault associated with a third party.

10. The method of claim 9, further comprising:
sharing a valet key with the third party, wherein the valet key enables the third party to search the encrypted data without exposing the encrypted data in cleartext.

11. The method of claim 1, further comprising:
generating searchable indices for the data, wherein the searchable indices comprises a set of searchable entangled strings in an encrypted form.

12. The method of claim 1, further comprising:
releasing the encrypted data in cleartext under a walled garden arrangement.

13. The method of claim 1, further comprising:
releasing the encrypted data to different users according to different release schemas.

14. The method of claim 1, further comprising:
releasing the encrypted data in different formats.

15. The method of claim 14, further comprising:
receiving a search request for the released data, the search request comprising a search term; and
translating the search term into a proper format according to a format that the encrypted data is released.

16. The method of claim 1, wherein the data entanglement process includes a key-based confusion process configured to obfuscate the data by preserving position context of each character included in the data.

17. An encrypted analytical vault, comprising:
a data preprocessing component configured to:
receive data for storage in a persistent data store associated with the encrypted analytical vault, and
apply a data entanglement process on the data prior to encryption to obtain entangled data, wherein the entangled data include an entangled string that, when examined by itself, does not divulge a corresponding original string included in the data; and
a cryptographic component configured to:
encrypt the entangled data, and
store the encrypted data in the persistent data store associated with the encrypted analytical vault, wherein the encrypted data is searchable using a native search engine,
wherein the data entanglement process includes a key-based confusion process configured to obfuscate the data by converting positional information of the data into a multidimensional output where positional information of each character included in the data is represented by a set of coordinates.

18. The encrypted analytical vault of claim 17, wherein the data is received from a business-to-business software-as-a-service provider.

19. The encrypted analytical vault of claim 17, wherein the persistent data store is a cloud-based storage.

* * * * *